(12) United States Patent
Germano et al.

(10) Patent No.: US 10,197,091 B1
(45) Date of Patent: Feb. 5, 2019

(54) CONNECTING-ROD WITH ONE OR MORE RECESS IN THE STEM TO REDUCE MASS, OPTIMIZE THE BALANCING BETWEEN ROTATING AND RECIPROCATING MASSES, AND OPTIMIZE THE CONNECTING-ROD BEARINGS MINIMUM OIL FILM THICKNESS

(71) Applicant: GM GLOBAL TECHNOLOGY OPERATIONS LLC, Detroit, MI (US)

(72) Inventors: Francesco Germano, Turin (IT); Fabio Numidi, Aglie (IT); Vito Rescina, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 10 days.

(21) Appl. No.: 15/671,120

(22) Filed: Aug. 7, 2017

(51) Int. Cl.
  *G05G 1/00* (2006.01)
  *F16C 7/02* (2006.01)
  *F16C 9/04* (2006.01)
  *F16C 11/02* (2006.01)

(52) U.S. Cl.
  CPC .............. *F16C 7/023* (2013.01); *F16C 9/04* (2013.01); *F16C 11/02* (2013.01)

(58) Field of Classification Search
  CPC ............. F16C 7/023; F16C 9/04; F16C 11/02
  USPC ...................................................... 123/197.3
  See application file for complete search history.

(56) References Cited

U.S. PATENT DOCUMENTS

| | | | | | |
|---|---|---|---|---|---|
| 1,819,784 | A | * | 8/1931 | McKone | F16C 9/04 29/888.09 |
| 1,831,325 | A | * | 11/1931 | Short | B21K 1/04 29/898.059 |
| 3,730,020 | A | * | 5/1973 | Di Matteo, Sr. | F16C 7/023 74/579 E |
| 4,827,795 | A | * | 5/1989 | Machida | F16C 7/023 123/197.3 |
| 5,660,086 | A | * | 8/1997 | Carey | F16C 7/023 123/90.61 |
| 5,673,666 | A | | 10/1997 | Beardmore et al. | |
| 6,907,848 | B2 | | 6/2005 | Beardmore | |
| 7,500,417 | B2 | * | 3/2009 | Ogawa | B21D 37/16 123/197.3 |

* cited by examiner

*Primary Examiner* — Marguerite McMahon
(74) *Attorney, Agent, or Firm* — Harness, Dickey & Pierce, P.L.C.

(57) ABSTRACT

A connecting rod for connecting between a crankshaft and a piston, includes a small end with a cylindrical hole adapted to for receiving a piston pin, a big end having a crank pin bore adapted for receiving a crank pin of a crankshaft and a stem portion extends between the small end and big end. The stem portion can have an I-beam cross-section with a pair of legs and a web extending between the pair of legs. The web includes oppositely facing surfaces defining a thickness that is less than a thickness of the pair of legs. The web includes at least one grooved/recessed portion that is recessed relative to the oppositely facing surfaces of the web.

18 Claims, 11 Drawing Sheets

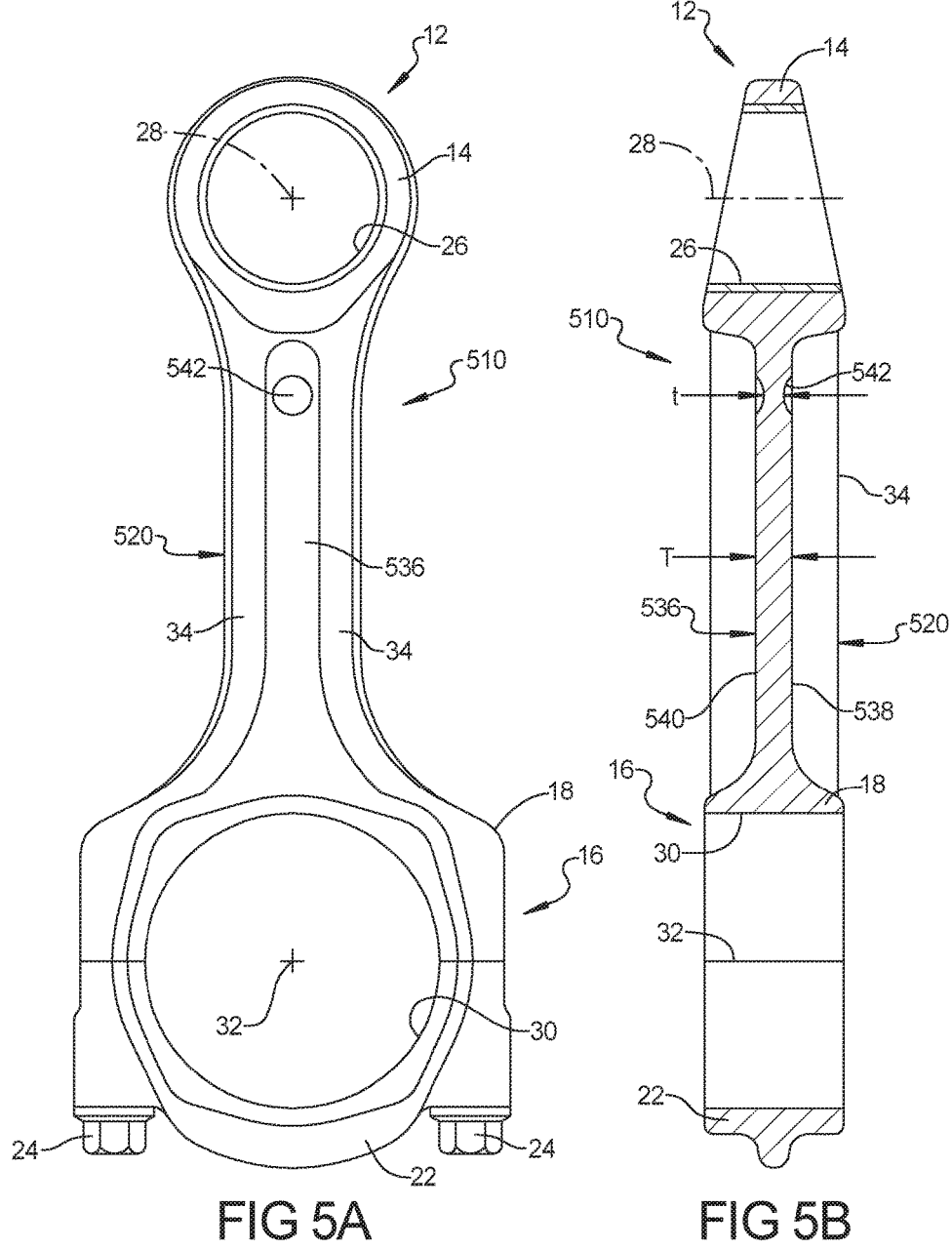

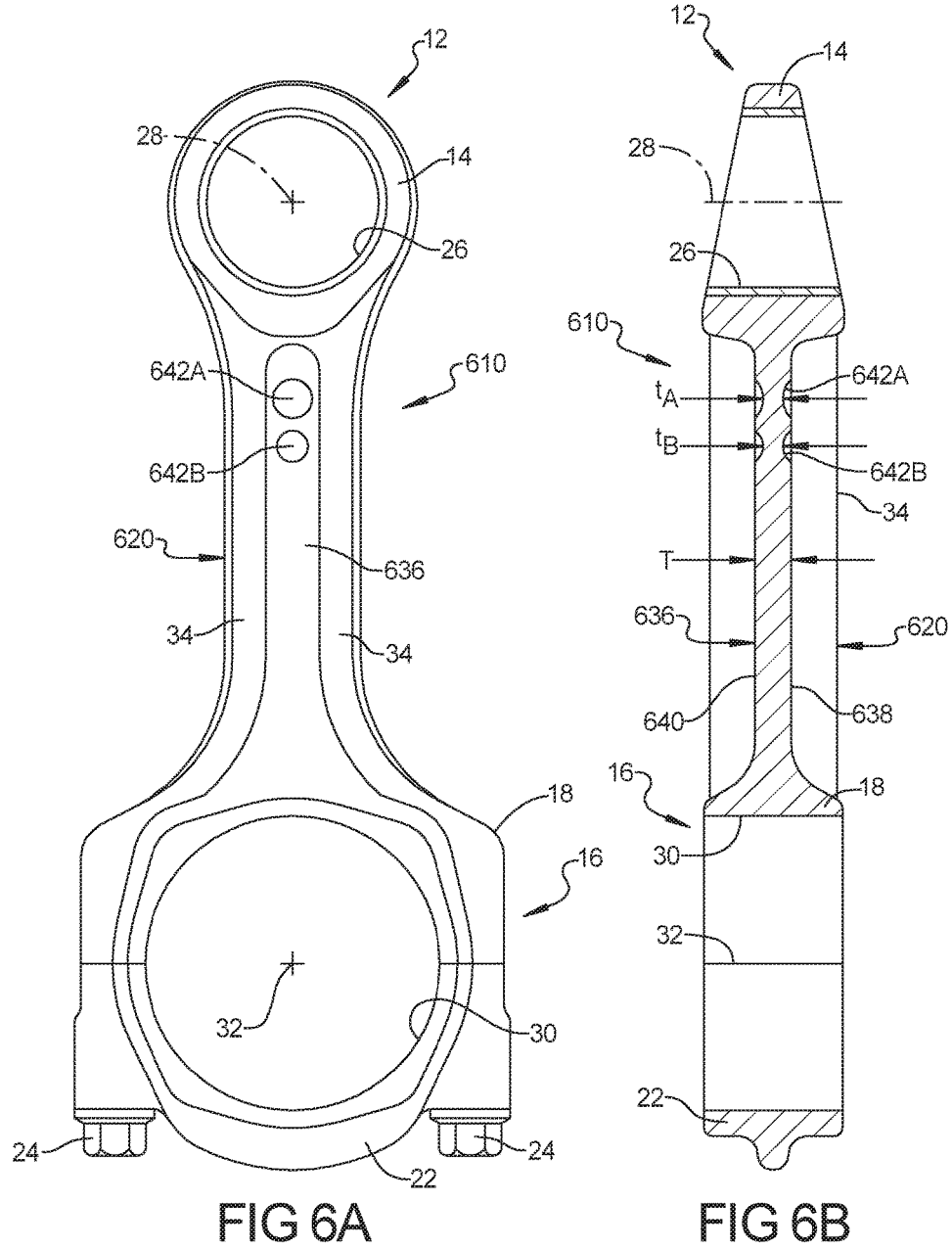

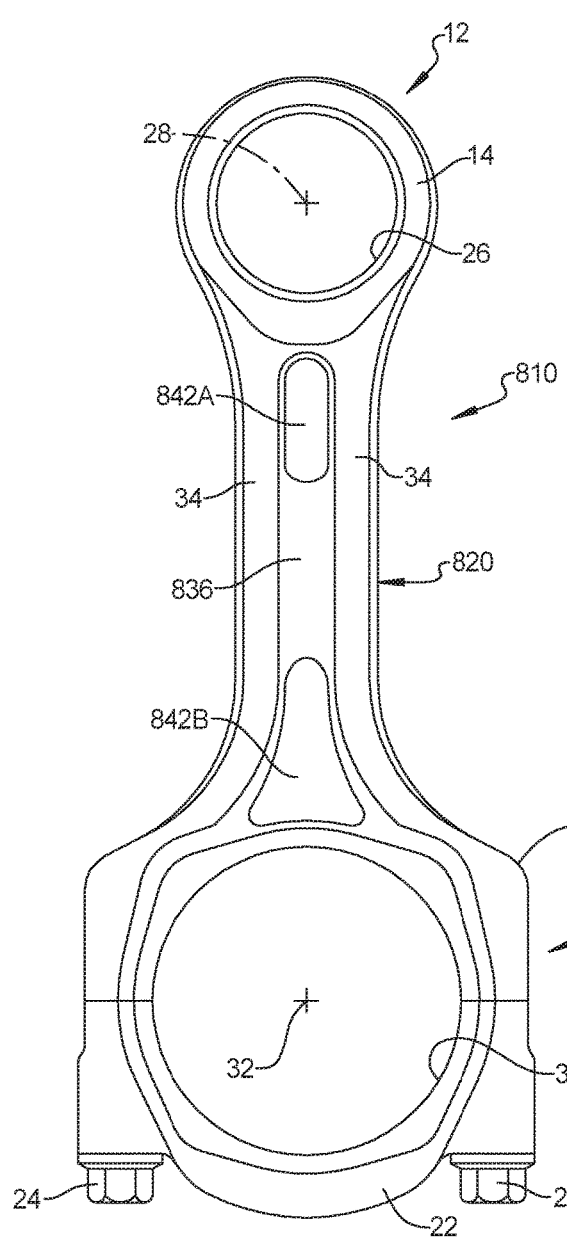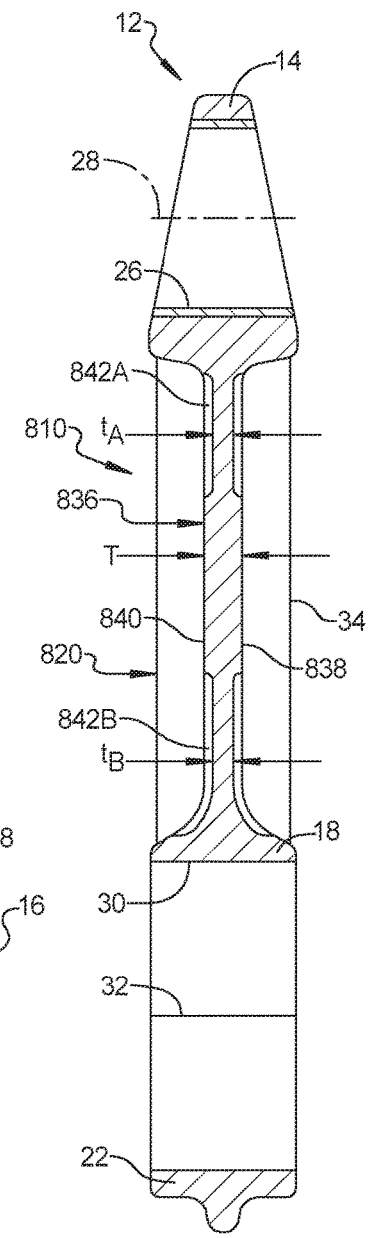
FIG 8A
FIG 8B

CONNECTING-ROD WITH ONE OR MORE RECESS IN THE STEM TO REDUCE MASS, OPTIMIZE THE BALANCING BETWEEN ROTATING AND RECIPROCATING MASSES, AND OPTIMIZE THE CONNECTING-ROD BEARINGS MINIMUM OIL FILM THICKNESS

FIELD

The present disclosure relates to a connecting rod for an internal combustion engine and more particularly to a connecting rod with different types of recess in the stem.

BACKGROUND

This section provides background information related to the present disclosure which is not necessarily prior art.

With reference to FIGS. 10A and 10B, a conventional connecting rod 1010 according to the principles of the present disclosure will now be described. The connecting rod 1010 is provided for connecting between a crankshaft and a piston as is well known in the art. The connecting rod 1010 includes a small end 1012 that can have a piston pin bushing 1014 which is adapted for receiving a piston pin and a big end 1016 having a crank pin bore 1018 to carry bearings adapted for receiving a crank pin of a crankshaft. A stem portion 1020 extends between the small end 1012 and the big end 1016. The connecting rod big end 1016 can include an end cap 1022 formed separate or cracked separate from the remaining portion of the connecting rod 1010 and connected thereto by bolts 1024.

The piston pin bushing 1014 includes a cylindrical hole 1026 for receiving a piston pin along an axis 1028. The crank pin bore 1018 includes an aperture 1030 which consists of a cylindrical hole for receiving bearings and a crank pin along an axis 1032. The stem portion 1020 can have an I-beam shaped cross-section including a pair of legs 1034 and a web 1036 extending therebetween. As shown in FIG. 10B, the web 1036 has oppositely facing surfaces 1038, 1040 that define a thickness T in a direction parallel to the axis 1032. In addition, FIG. 10C is a cross sectional view of the stem portion 1020 taken along line 10C-10C of FIG. 10A.

It is desirable to provide a connecting rod with reduced mass and an optimized position of center of gravity.

SUMMARY

This section provides a general summary of the disclosure, and is not a comprehensive disclosure of its full scope or all of its features.

A connecting rod for connecting between a crankshaft and a piston, includes a small end that can have a piston pin bushing which is adapted for receiving a piston pin. A big end has a crank pin bore to carry bearings and a crank pin of a crankshaft. A stem portion extends between the small end and the big end. The stem portion can have an I-beam cross-section with a pair of legs and a web extending between the pair of legs. The web includes oppositely facing surfaces defining a thickness that is less than a thickness of the pair of legs. The web includes at least one grooved portion that is recessed relative to facing surfaces of the web.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5A and 5B are plan and cross-sectional views, respectively, of a connecting rod according to a fifth embodiment of the present disclosure;

FIGS. 6A and 6B are plan and cross-sectional views, respectively, of a connecting rod according to a sixth embodiment of the present disclosure;

FIGS. 8A and 8B are plan and cross-sectional views, respectively, of a connecting rod according to an eighth embodiment of the present disclosure;

Corresponding reference numerals indicate corresponding parts throughout the several views of the drawings.

DETAILED DESCRIPTION

Figures 1A, 1B:
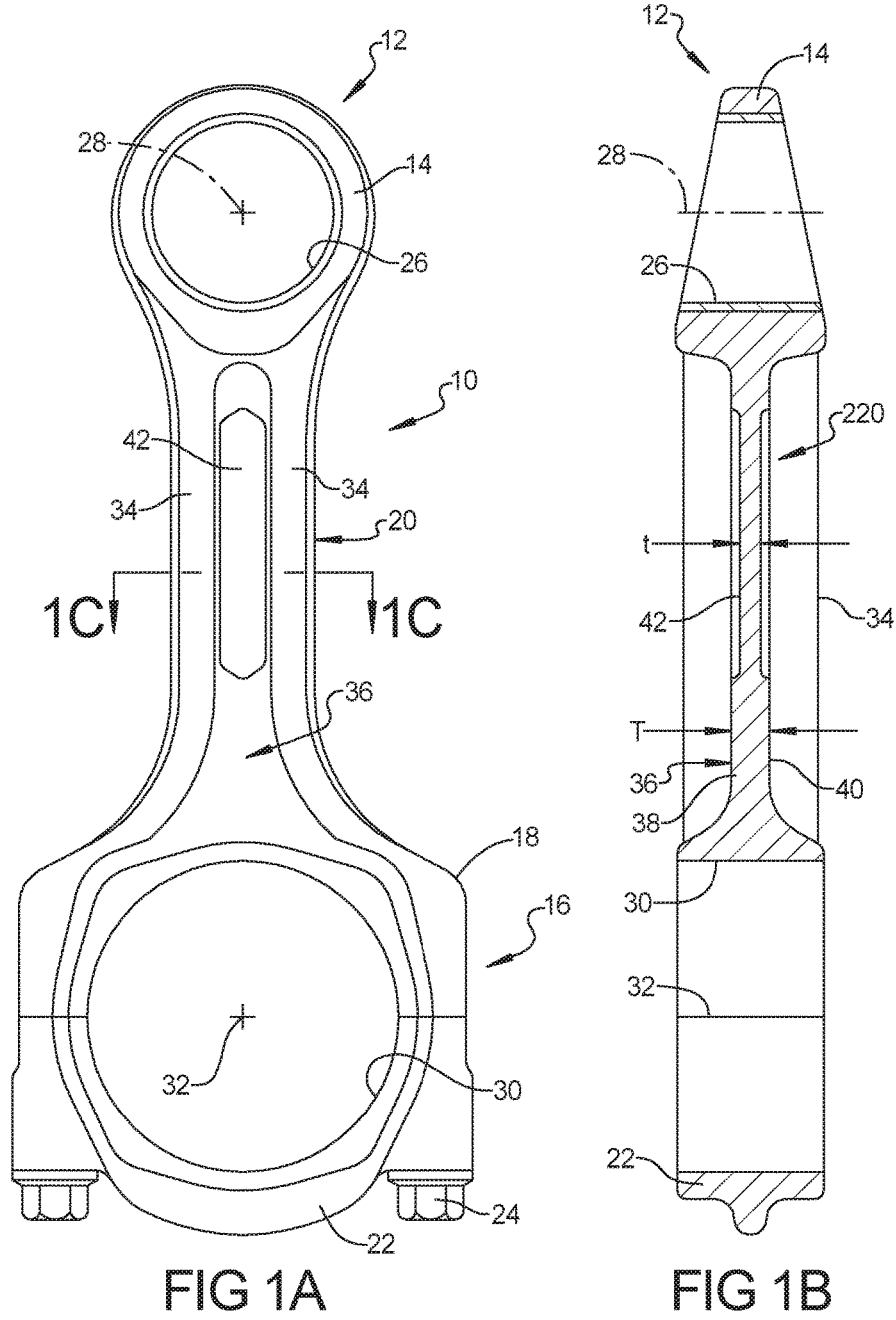
FIGS. 1A and 1B are plan and cross-sectional views, respectively, of a connecting rod according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1C:
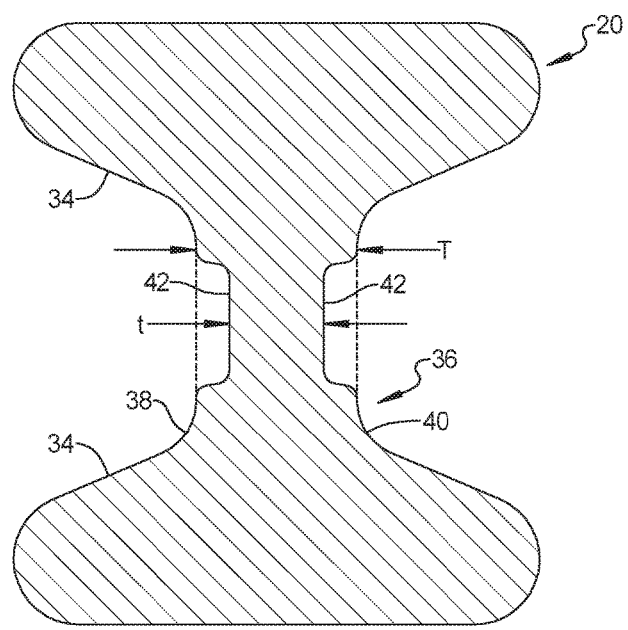
FIG. 1C is a cross-section of the stem portion taken along line 1C-1C with grooves/recesses according to the principles of the present disclosure.
Figure 10C:
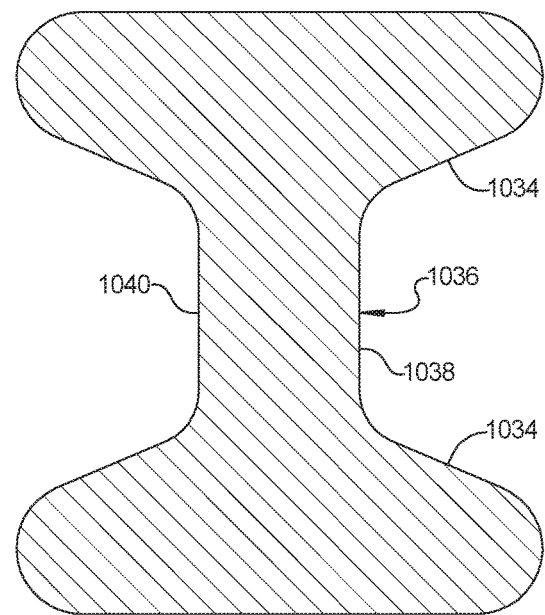
FIG. 10C is a cross-section of the beam without grooves-recesses.

With reference to FIGS. 1A-1C, a connecting rod 10 according to the principles of the present disclosure will now be described. The connecting rod 10 is provided for connecting between a crankshaft and a piston as is well known in the art. The connecting rod 10 includes a first small end 12 having a piston pin bushing 14 which is adapted for receiving a piston pin and a big end 16 having a crank pin bore 18 adapted for receiving a crank pin of a crankshaft. A stem portion 20 extends between the small end 12 and the big end 16. The connecting rod big end 16 can include an end cap 22 formed separate (or cracked) from the remaining portion of the connecting rod 10 and connected thereto by bolts 24.

The piston pin small end 12 can have a bushing 14; in both cases, with or without the bushing, it includes a cylindrical hole 26 for receiving a piston pin along an axis 28. The crank pin bore 18 includes an aperture 30 which consists of a cylindrical hole for receiving bearings and crank pin along an axis 32. The stem portion 20 can have an I-beam cross-section including a pair of legs 34 and a web 36 extending therebetween. As shown in FIGS. 1B and 1C, the web 36 has oppositely facing surfaces 38, 40 defining a thickness T in a direction parallel to the axis 32. The surfaces 38, 40 of the web 36 are each provided with one or more grooved/recessed portion 42 that is recessed relative to the surfaces 38, 40 to move the connecting rod center of gravity and reduce weight and control the rotating/reciprocating mass distribution. The grooved/recessed portion 42, as shown FIGS. 1A-1C can be provided on both sides (surfaces 38, 40) of the web 36 or alternatively can be provided on just one side and provides a region of reduced thickness t as compared to the thickness T of the web 36. The shape of the grooved/recessed portion(s) 42 can be generally rectangular or oval, as shown, and can be generally centrally located along the stem portion 20 between the small end 12 and big end 16.

Figures 2A, 2B:
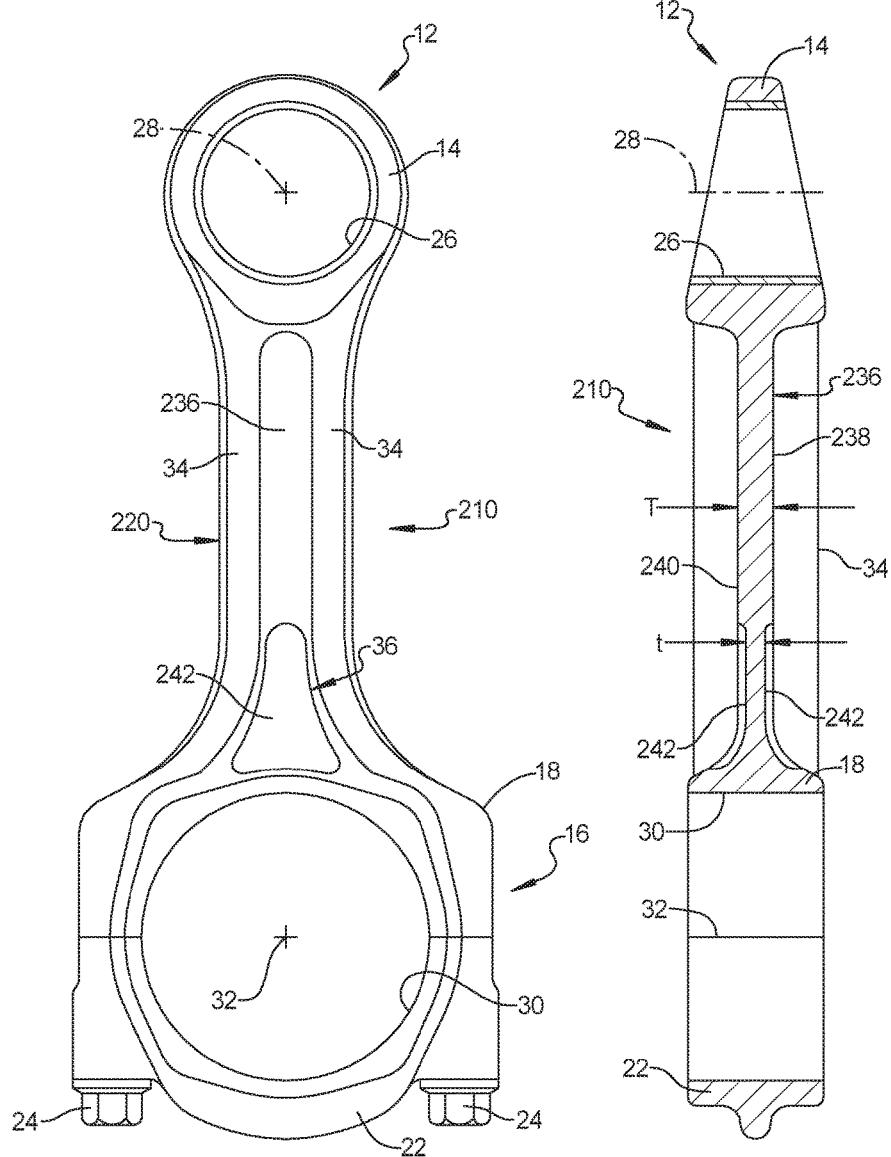
FIGS. 2A and 2B are plan and cross-sectional views, respectively, of a connecting rod according to a second embodiment of the present disclosure.

With reference to FIGS. 2A and 2B, an alternative connecting rod 210 according to the principles of the present disclosure will now be described. The connecting rod 210 is provided for connecting between a crankshaft and a piston as is well known in the art. The connecting rod 210 includes a first small end 12 having a piston pin bushing 14 which is adapted for receiving a piston pin and a big end 16 having a crank pin bore 18 adapted for receiving a crank pin of a crankshaft. A stem portion 220 extends between the small end 12 and the big end 16. The connecting rod big end 16 can include an end cap 22 formed separate (or cracked) from the remaining portion of the connecting rod 210 and connected thereto by bolts 24.

The piston pin small end 12 can have a bushing 14; in both cases, with or without the bushing, it includes a cylindrical hole 26 for receiving a piston pin along an axis 28. The crank pin bore 18 includes an aperture 30 which consists of a cylindrical hole for receiving bearings and a crank pin along an axis 32. The stem portion 220 can have an I-beam cross-section including a pair of legs 34 and a web 236 extending therebetween. As shown in FIG. 2B, the web 236 has oppositely facing surfaces 238, 240 defining a thickness T in a direction parallel to the axis 32. The surfaces 238, 240 of the web 236 are each provided with a recessed portion 242 that is recessed relative to the surfaces 238, 240 to move the connecting rod center of gravity and reduce weight and control the rotating/reciprocating mass distribution. The grooved/recessed portion 242, as shown FIGS. 2A and 2B can be provided on both sides (surfaces 238, 240) of the web 236 or alternatively can be provided on just one side and provides a region of reduced thickness t as compared to the thickness T of the web 236. The shape of the grooved/recessed portion(s) 242 can be generally triangular or tennis racket groove shape, as shown, and can be generally located proximal to the big end 16.

Figures 3A, 3B:
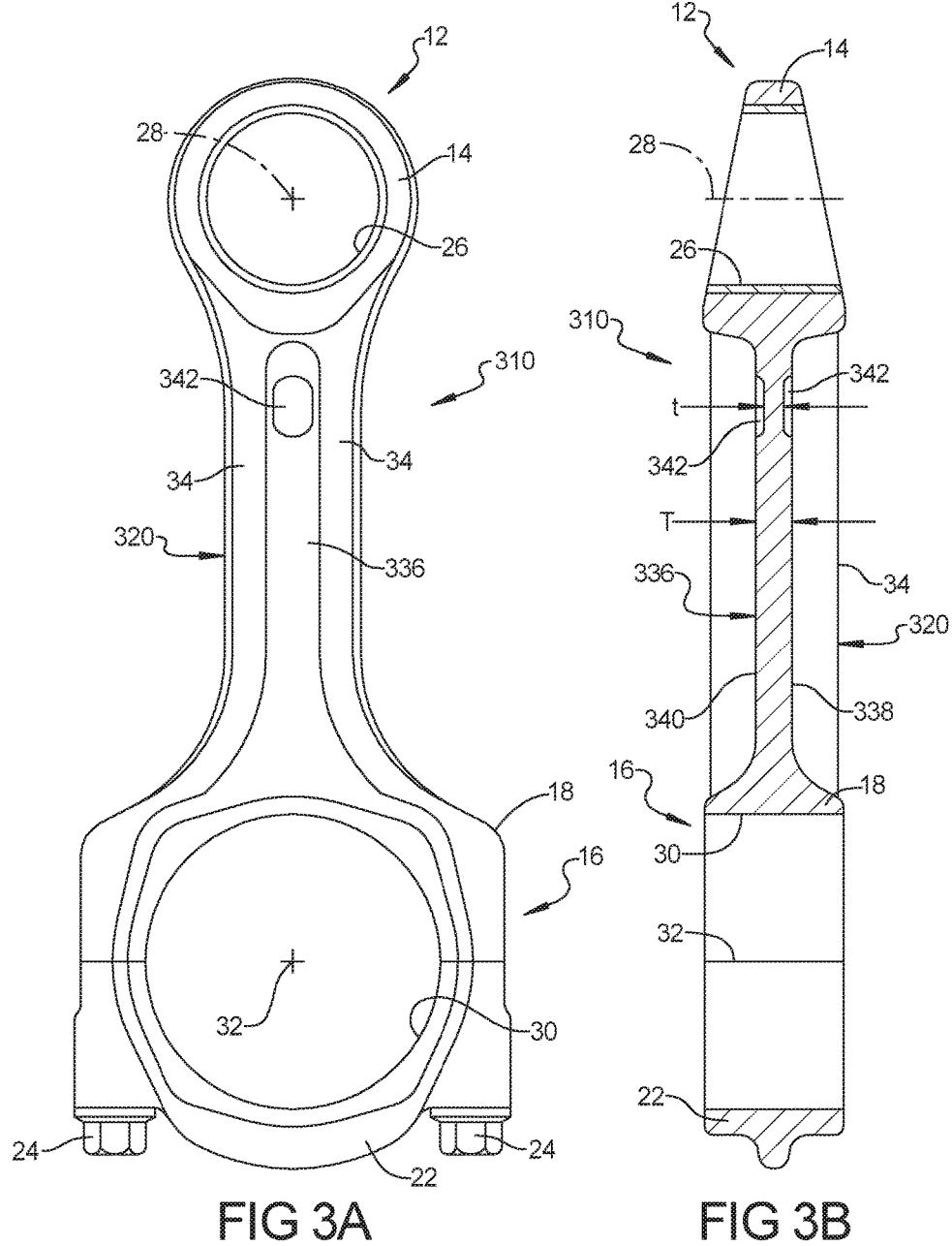
FIGS. 3A and 3B are plan and cross-sectional views, respectively, of a connecting rod according to a third embodiment of the present disclosure.

With reference to FIGS. 3A and 3B, an alternative connecting rod 310 according to the principles of the present disclosure will now be described. The connecting rod 310 is provided for connecting between a crankshaft and a piston as is well known in the art. The connecting rod 310 includes a small end 12 having a piston pin bushing 14 which is adapted for receiving a piston pin and a big end 16 having a crank pin bore 18 adapted for receiving a crank pin of a crankshaft. A stem portion 320 extends between the small end 12 and the big end 16. The connecting rod big end 16 can include an end cap 22 formed separate (or cracked) from the remaining portion of the connecting rod 310 and connected thereto by bolts 24.

The piston pin small end 12 can have a bushing 14; in both cases, with or without the bushing, it includes a cylindrical hole 26 for receiving a piston pin along an axis 28. The crank pin bore 18 includes an aperture 30 which consists of a cylindrical hole for receiving bearings and a crank pin along an axis 32. The stem portion 320 can have an I-beam cross-section including a pair of legs 34 and a web 336 extending therebetween. As shown in FIG. 3B, the web 336 has oppositely facing surfaces 338, 340 defining a thickness T in a direction parallel to the axis 32. The surfaces 338, 340 of the web 336 are each provided with a recessed portion 342 that is recessed relative to the surfaces 338, 340 to move the connecting rod center of gravity and reduce weight and control the rotating/reciprocating mass distribution. The grooved/recessed portion 342, as shown FIGS. 3A and 3B can be provided on both sides (surfaces 338, 340) of the web 336 or alternatively can be provided on just one side and provides a region of reduced thickness t as compared to the thickness T of the web 336. The shape of the grooved/recessed portion(s) 342 can be generally oblong as shown, and can be generally located between big end 16 and small end 12.

Figures 4A, 4B:
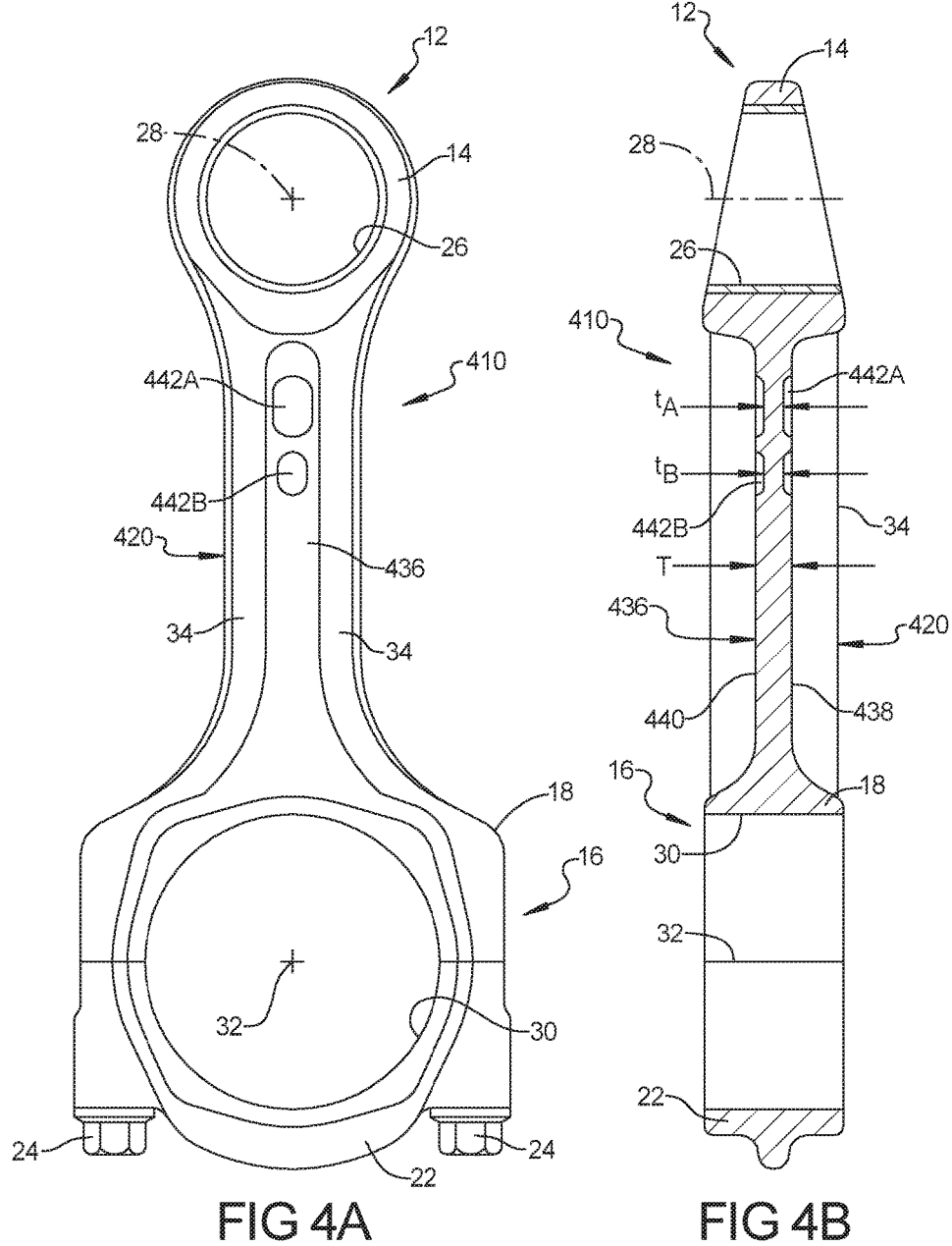
FIGS. 4A and 4B are plan and cross-sectional views, respectively, of a connecting rod according to a fourth embodiment of the present disclosure.

With reference to FIGS. 4A and 4B, an alternative connecting rod 410 according to the principles of the present disclosure will now be described. The connecting rod 410 is provided for connecting between a crankshaft and a piston as is well known in the art. The connecting rod 410 includes a small end 12 having a piston pin bushing 14 which is adapted for receiving a piston pin and a big end 16 having a crank pin bore 18 adapted for receiving a crank pin of a crankshaft. A stem portion 420 extends between the small end 12 and the big end 16. The connecting rod big end 16 can include an end cap 22 formed separate (or cracked) from the remaining portion of the connecting rod 410 and connected thereto by bolts 24.

The piston pin small end 12 can have a bushing 14; in both cases, with or without the bushing, it includes a cylindrical hole 26 for receiving piston pin along an axis 28. The crank pin bore 18 includes an aperture 30 which consists of a cylindrical hole for receiving bearings and a crank pin along an axis 32. The stem portion 420 can have an I-beam cross-section including a pair of legs 34 and a web 436 extending therebetween. As shown in FIG. 4B, the web 436 has oppositely facing surfaces 438, 440 defining a thickness T in a direction parallel to the axis 32. The surfaces 438, 440 of the web 436 are each provided with multiple recessed portions 442A, 442B that are recessed relative to the surfaces 438, 440 to move the connecting rod center of gravity and reduce weight and control the rotating/reciprocating mass distribution. The multiple grooved/recessed portions 442A,442B, as shown FIGS. 4A and 4B can be provided on both sides (surfaces 438, 440) of the web 436 or alternatively can be provided on just one side and provides multiple regions of reduced thickness tA, tB as compared to the thickness T of the web 436. The size and shape of the recessed portions 442A, 442B can be different such as rectangular and oval, as shown and can be generally located between big end 16 and small end 12.

With reference to FIGS. 5A and 5B, an alternative connecting rod 510 according to the principles of the present disclosure will now be described. The connecting rod 510 is provided for connecting between a crankshaft and a piston as is well known in the art. The connecting rod 510 includes a small end 12 having a piston pin bushing 14 which is adapted for receiving a piston pin and a big end 16 having a crank pin bore 18 adapted for receiving a crank pin of a crankshaft. A stem portion 520 extends between the small end 12 and the big end 16. The connecting rod big end 16 can include an end cap 22 formed separate (or cracked) from the remaining portion of the connecting rod 510 and connected thereto by bolts 24.

The piston pin small end 12 can have a bushing 14; in both cases, with or without the bushing, it includes a cylindrical hole 26 for receiving a piston pin along an axis 28. The crank pin bore 18 includes an aperture 30 which consists of a cylindrical hole for receiving bearings and crank pin along an axis 32. The stem portion 520 can have an I-beam cross-section including a pair of legs 34 and a web 536 extending therebetween. As shown in FIG. 5B, the web 536 has oppositely facing surfaces 538, 540 defining a thickness T in a direction parallel to the axis 32. The surfaces 538, 540 of the web 536 are each provided with recessed portions 542 that are recessed relative to the surfaces 538, 540 to move the connecting rod center of gravity and reduce weight and control the rotating/reciprocating mass distribution. The recessed portion 542, as shown in FIGS. 5A and 5B can be provided on both sides (surfaces 538, 540) of the web 536 or alternatively can be provided on just one side and provide a region of reduced thickness t as compared to the thickness T of the web 536. The shape of the recessed portion(s) 542 can be generally circular, as shown and can be generally located between the big end 16 and the small end 12.

With reference to FIGS. 6A and 6B, an alternative connecting rod 610 according to the principles of the present disclosure will now be described. The connecting rod 610 is provided for connecting between a crankshaft and a piston as is well known in the art. The connecting rod 610 includes a small end 12 having a piston pin bushing 14 which is adapted for receiving a piston pin and a big end 16 having a crank pin bore 18 adapted for receiving a crank pin of a crankshaft. A stem portion 620 extends between the small end 12 and the big end 16. The connecting rod big end 16 can include an end cap 22 formed separate (or cracked) from the remaining portion of the connecting rod 610 and connected thereto by bolts 24.

The piston pin small end 12 can have a bushing 14; in both cases, with or without the bushing, it includes a cylindrical hole 26 for receiving a piston pin along an axis 28. The crank pin bore 18 includes an aperture 30 which consists of a cylindrical hole for receiving bearings and a crank pin along an axis 32. The stem portion 620 can have an I-beam cross-section including a pair of legs 34 and a web 636 extending therebetween. As shown in FIG. 6B, the web 636 has oppositely facing surfaces 638, 640 defining a thickness T in a direction parallel to the axis 32. The surfaces 638, 640 of the web 636 are each provided with multiple recessed portions 642A, 642B, that are recessed relative to the surfaces 638, 640 to move the connecting rod center of gravity and reduce weight and control the rotating/reciprocating mass distribution. The recessed portions 642A,642B, as shown FIGS. 6A and 6B can be provided on both sides (surfaces 638, 640) of the web 636 or alternatively can be provided on just one side and provide a region of reduced thicknesses tA, tB as compared to the thickness T of the web 636. The sizes of the recessed portion(s) 642A,642B can be different such as different sized circular recesses 642A, 642B, as shown and can be generally located between the big end 16 and the small end 12.

Figures 7A, 7B:
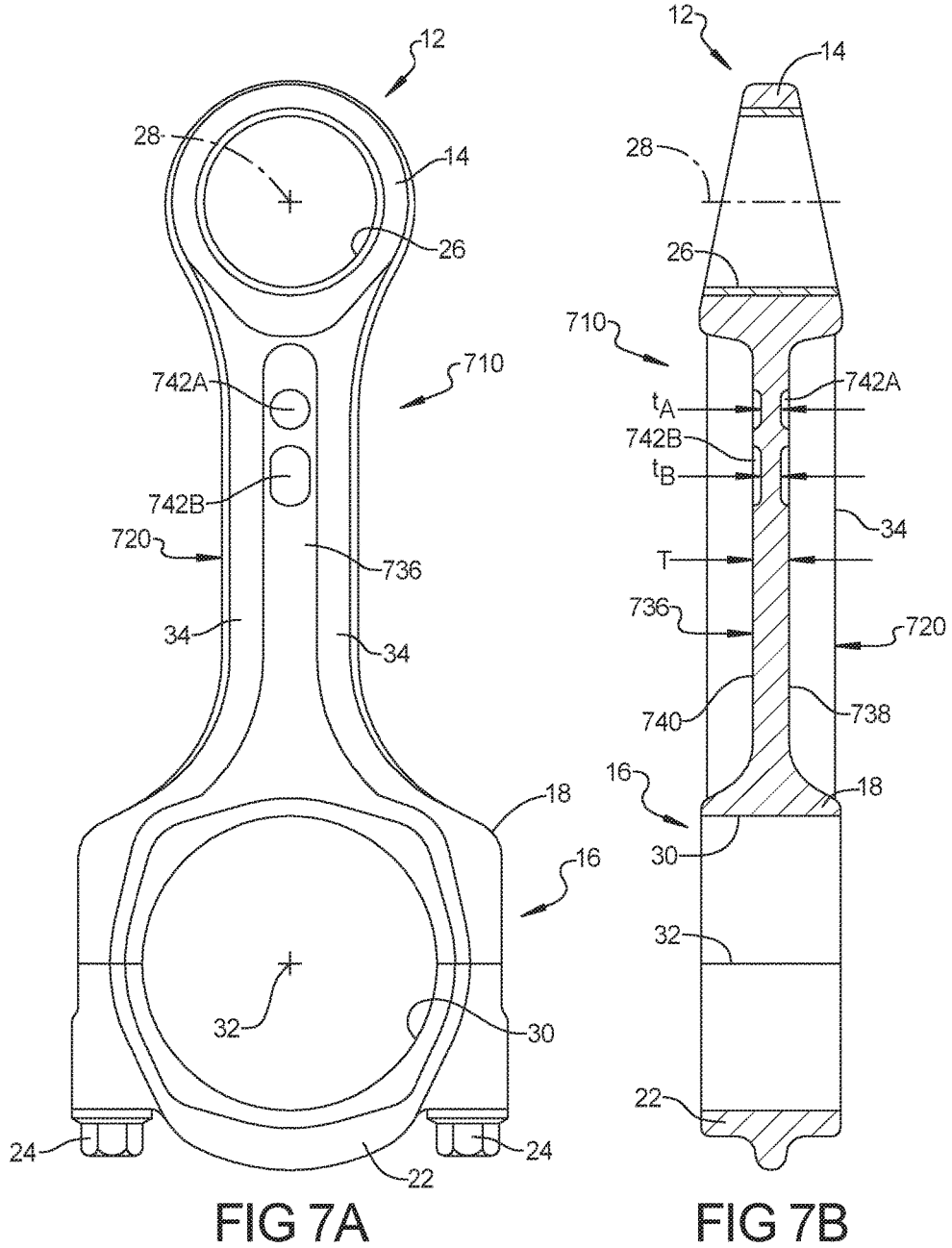
FIGS. 7A and 7B are plan and cross-sectional views, respectively, of a connecting rod according to a seventh embodiment of the present disclosure.

With reference to FIGS. 7A and 7B, an alternative connecting rod 710 according to the principles of the present disclosure will now be described. The connecting rod 710 is provided for connecting between a crankshaft and a piston as is well known in the art. The connecting rod 710 includes a small end 12 having a piston pin bushing 14 which is adapted for receiving a piston pin and a big end 16 having a crank pin bore 18 adapted for receiving a crank pin of a crankshaft. A stem portion 720 extends between the small end 12 and the big end 16. The connecting rod big end 16 can include an end cap 22 formed separate (or cracked) from the remaining portion of the connecting rod 710 and connected thereto by bolts 24.

The piston pin small end 12 can have a bushing 14; in both cases, with or without the bushing, it includes a cylindrical hole 26 for receiving a piston pin along an axis 28. The crank pin bore 18 includes an aperture 30 which consists of a cylindrical hole for receiving bearings and a crank pin along an axis 32. The stem portion 720 can have an I-beam cross-section including a pair of legs 34 and a web 736 extending therebetween. As shown in FIG. 7B, the web 736 has oppositely facing surfaces 738, 740 defining a thickness T in a direction parallel to the axis 32. The surfaces 738, 740 of the web 736 are each provided with multiple recessed portions 742A, 742B, that are recessed relative to the surfaces 738, 740 to move the connecting rod center of gravity and reduce weight and control the rotating/reciprocating mass distribution. The recessed portions 742A,742B, as shown FIGS. 7A and 7B can be provided on both sides (surfaces 738, 740) of the web 736 or alternatively can be provided on just one side and provide a region of reduced thicknesses tA, tB as compared to the thickness T of the web 736. The sizes of the recessed portion(s) 742A,742B can be different such as different sized circular and/or rectangular recesses 742A, 742B, as shown and can be generally located between the big end 16 and the small end 12.

With reference to FIGS. 8A and 8B, an alternative connecting rod 810 according to the principles of the present disclosure will now be described. The connecting rod 810 is provided for connecting between a crankshaft and a piston as is well known in the art. The connecting rod 810 includes a small end 12 having a piston pin bushing 14 which is adapted for receiving a piston pin and a big end 16 having a crank pin bore 18 adapted for receiving a crank pin of a crankshaft. A stem portion 820 extends between the small end 12 and the big end 16. The connecting rod big end 16 can include an end cap 22 formed separate (or cracked) from the remaining portion of the connecting rod 810 and connected thereto by bolts 24.

The piston pin small end 12 can have a bushing 14; in both cases, with or without the bushing, it includes a cylindrical hole 26 for receiving a piston pin along an axis 28. The crank pin bore 18 includes an aperture 30 which consists of a cylindrical hole for receiving bearings and a crank pin along an axis 32. The stem portion 820 can have an I-beam cross-section including a pair of legs 34 and a web 836 extending therebetween. As shown in FIG. 8B, the web 836 has oppositely facing surfaces 838, 840 defining a thickness T in a direction parallel to the axis 32. The surfaces 838, 840 of the web 836 are each provided with multiple recessed portions 842A, 842B, that are recessed relative to the surfaces 838, 840 to move the connecting rod center of gravity and reduce weight and control the rotating/reciprocating mass distribution. The recessed portions 842A,842B, as shown FIGS. 8A and 8B can be provided on both sides (surfaces 838, 840) of the web 836 or alternatively can be provided on just one side and provide a region of reduced thicknesses tA, tB as compared to the thickness T of the web 836. The sizes and shape of the grooved/recessed portion(s) 842A,842B can be different such as different sized circular and/or triangular (tennis racket shape) recesses 842A, 842B, as shown and can be generally located between the big end 16 and the small end 12.

Figures 9A, 9B:
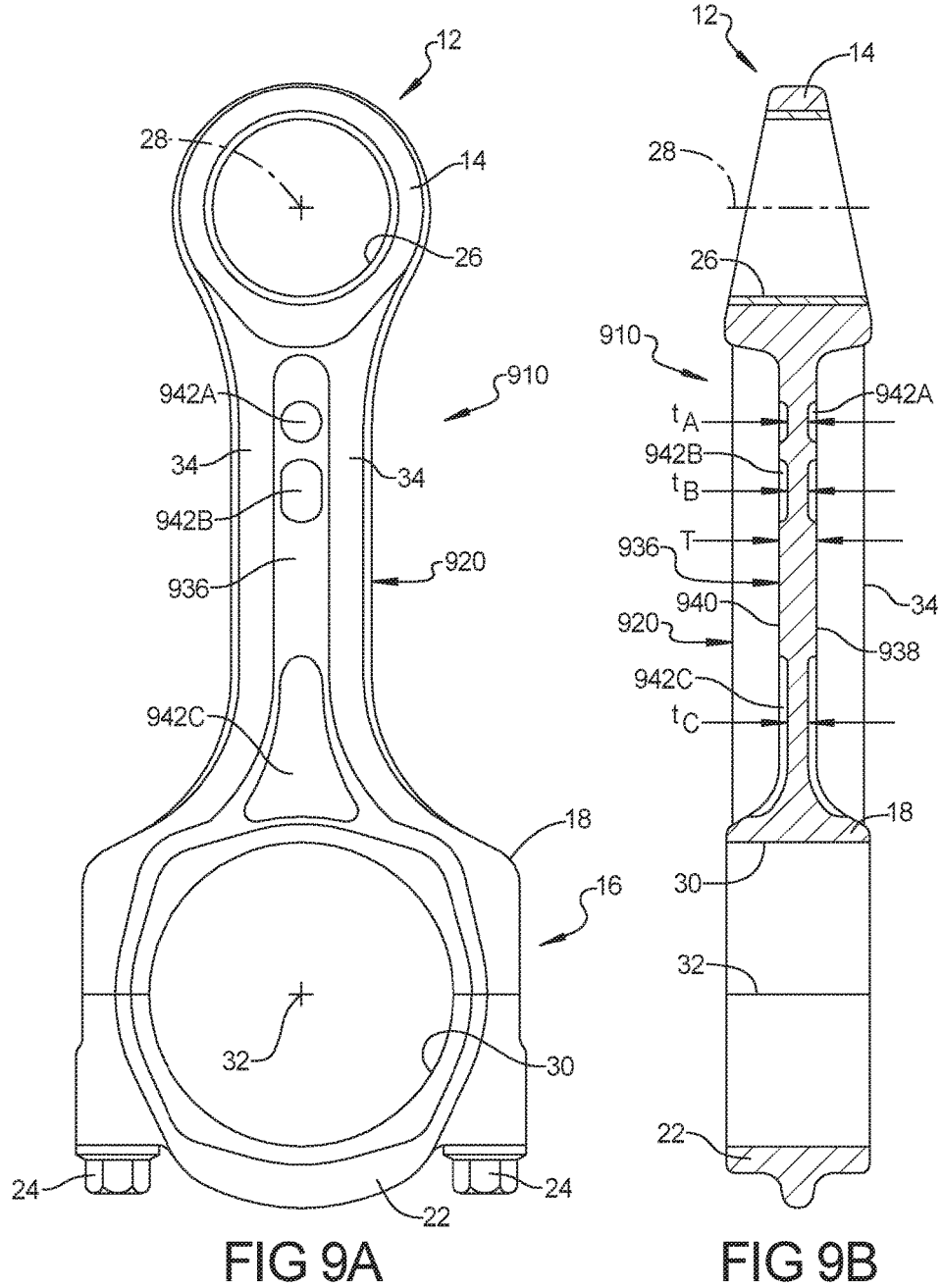
FIGS. 9A and 9B are plan and cross-sectional views, respectively, of a connecting rod according to a ninth embodiment of the present disclosure.
Figures 10A, 10B:
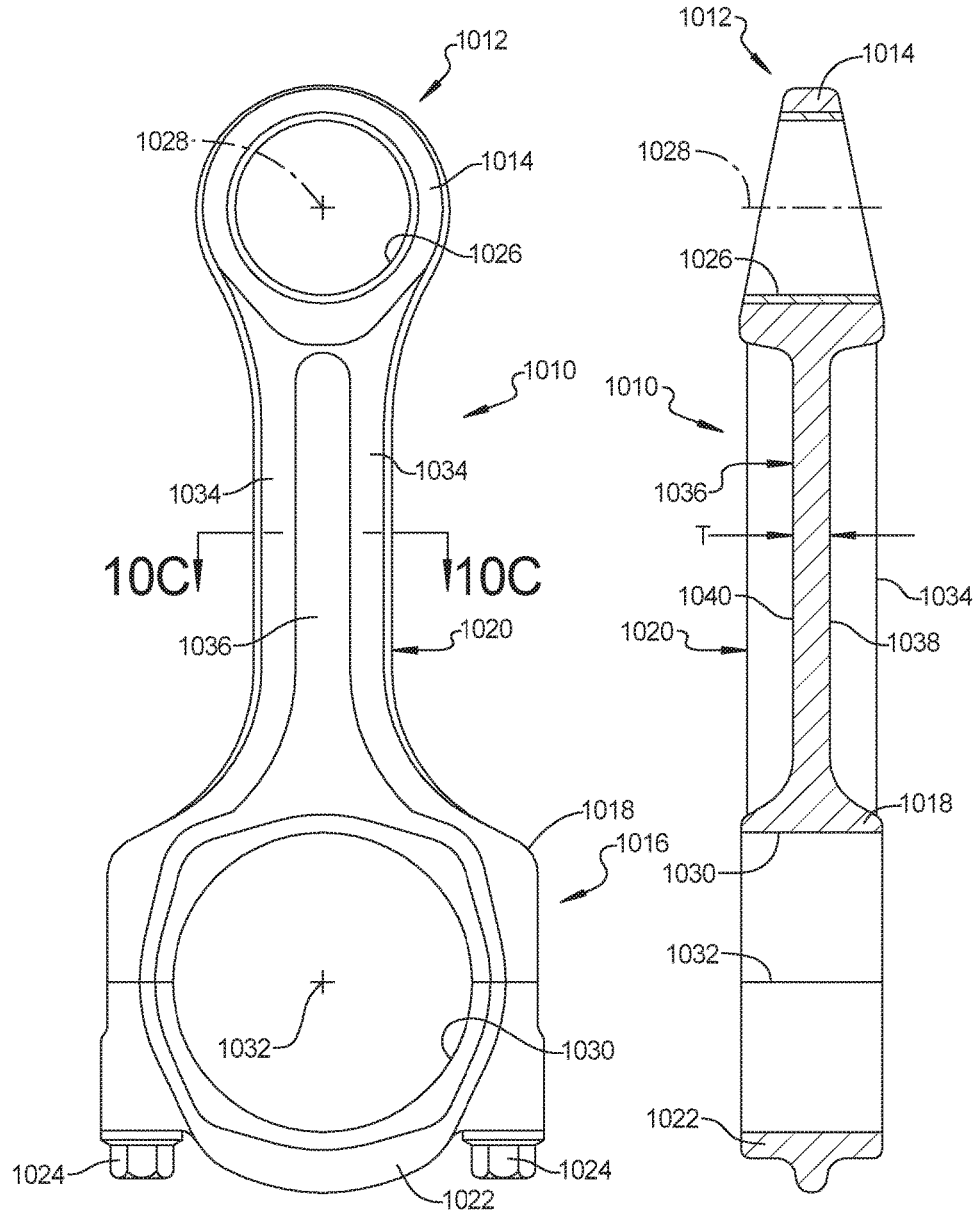
FIGS. 10A and 10B are plan and cross-sectional views, respectively, of a conventional connecting rod.

With reference to FIGS. 9A and 9B, an alternative connecting rod 910 according to the principles of the present disclosure will now be described. The connecting rod 910 is provided for connecting between a crankshaft and a piston as is well known in the art. The connecting rod 910 includes a small end 12 having a piston pin bushing 14 which is adapted for receiving a piston pin and a big end 16 having a crank pin bore 18 adapted for receiving a crank pin of a crankshaft. A stem portion 920 extends between the small end 12 and the big end 16. The connecting rod big end 16 can include an end cap 22 formed separate (or cracked) from the remaining portion of the connecting rod 910 and connected thereto by bolts 24.

The piston pin small end 12 can have a bushing 14; in both cases, with or without the bushing, it includes a cylindrical hole 26 for receiving a piston pin along an axis 28. The crank pin bore 18 includes an aperture 30 which consists of a cylindrical hole for receiving bearings and a crank pin along an axis 32. The stem portion 920 can have an I-beam cross-section including a pair of legs 34 and a web 936 extending therebetween. As shown in FIG. 9B, the web 936 has oppositely facing surfaces 938, 940 defining a thickness T in a direction parallel to the axis 32. The surfaces 938, 940 of the web 936 are each provided with multiple recessed portions 942A, 942B, 942C that are recessed relative to the surfaces 938, 940 to move the connecting rod center of gravity and reduce weight and control the rotating/reciprocating mass distribution. The recessed portions 942A, 942B, 942C, as shown FIGS. 9A and 9B can be provided on both sides (surfaces 938, 940) of the web 936 or alternatively can be provided on just one side and provide regions of reduced thicknesses tA, tB, tC as compared to the thickness T of the web 936. The sizes and shape of the grooved/recessed portion(s) 942A,942B, 942C can be different such as different sized circular, rectangular and/or triangular (tennis racket shape) recesses 942A, 942B, 942C as shown and can be generally located between the big end 16 and the small end 12.

The numerous above-described exemplary embodiments disclose numerous locations, shapes and sizes of the disclosed recessed portions. It should be understood that the various features can be combined in various ways beyond the numerous disclosed embodiments herein. The use of the additional grooves/recesses, as disclosed, allow for the movement of a center of gravity of the connecting rod as well as the control of and a reduction of the rotating/reciprocating masses in a manner that goes beyond the conventional I beam shaped stem, and/or for general section shape stem.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A connecting rod for connecting between a crankshaft and a piston, comprising:
   a connecting rod small end having a cylindrical hole adapted to for receiving a piston pin;
   a connecting rod big end adapted to for receiving a crank pin of a crankshaft;
   a stem portion extending between the connecting rod small end and the connecting rod big end and having an I-beam cross-section with a pair of legs and a web extending between the pair of legs, the web having oppositely facing surfaces defining a thickness in a longitudinal direction of an axis of the crankshaft bearing boss that is less than a thickness of the pair of legs in the longitudinal direction of the axis of the crankshaft bearing boss, the web having at least one recessed portion that is recessed relative to at least one of the oppositely facing surfaces of the web.

2. The connecting rod according to claim 1, wherein the at least one recessed portion is circular in shape.

3. The connecting rod according to claim 2, wherein the at least one recessed portion is disposed between the connecting rod small end and the connecting rod big end.

4. The connecting rod according to claim 3, wherein the at least one recessed portion includes at least one recessed portion disposed on both of the oppositely facing surfaces of the web.

5. The connecting rod according to claim 1, wherein the at least one recessed portion is generally rectangular in shape.

6. The connecting rod according to claim 5, wherein the at least one recessed portion is disposed between the connecting rod small end and the connecting rod big end.

7. The connecting rod according to claim 6, wherein the at least one recessed portion includes at least one recessed portion disposed on both oppositely facing surfaces of the web.

8. The connecting rod according to claim 1, wherein the at least one recessed portion is generally triangular in shape.

9. The connecting rod according to claim 8, wherein the at least one recessed portion is disposed proximate to one of the connecting rod big end or the connecting rod small end.

10. The connecting rod according to claim 9, wherein the at least one recessed portion includes at least one recessed portion disposed on both oppositely facing surfaces of the web.

11. The connecting rod according to claim 1, wherein the at least one recessed portion is oval/oblong in shape.

12. The connecting rod according to claim 11, wherein the at least one recessed portion is disposed between the connecting rod small end and the connecting rod big end.

13. The connecting rod according to claim 12, wherein the at least one recessed portion includes at least one recessed portion disposed on both oppositely facing surfaces of the web.

14. The connecting rod according to claim 1, wherein the at least one recessed portion includes a plurality of recessed portions longitudinally spaced from one another along the stem portion.

15. The connecting rod according to claim 1, wherein the at least one recessed portion is disposed proximate to the connecting rod small end.

16. The connecting rod according to claim 1, wherein the at least one recessed portion is disposed proximate to the connecting rod big end.

17. The connecting rod according to claim 1, wherein the at least one recessed portion includes a plurality of recessed portions longitudinally spaced at opposite ends of the stem portion.

18. The connecting rod according to claim 1, wherein the at least one recessed portion includes at least one recessed portion disposed on each of the oppositely facing surfaces of the web.

* * * * *